United States Patent [19]

Berger

[11] Patent Number: 5,641,088
[45] Date of Patent: Jun. 24, 1997

[54] CANISTER WITH POROUS PLASTIC ENDS

[75] Inventor: Lora L. Berger, Amherst, N.Y.

[73] Assignee: Multisorb Technologies, Inc., Buffalo, N.Y.

[21] Appl. No.: 449,016

[22] Filed: May 24, 1995

Related U.S. Application Data

[62] Division of Ser. No. 219,400, Mar. 29, 1994, Pat. No. 5,503,662.

[51] Int. Cl.$^6$ ............................................. B65D 6/28
[52] U.S. Cl. .................. 220/613; 206/0.7; 206/204; 206/524.4; 95/91; 96/118
[58] Field of Search ................................ 215/232, 261, 215/263; 220/359, 369, 370, 371, 372, 373, 612, 613, 367; 95/90, 91; 96/108, 118; 206/204, 0.7, 524.4

[56] References Cited

U.S. PATENT DOCUMENTS

| | | |
|---|---|---|
| 2,702,089 | 2/1955 | Engelder . |
| 2,873,877 | 2/1959 | Morin . |
| 2,994,404 | 8/1961 | Schifferly . |
| 3,240,567 | 3/1966 | Caparreli et al. . |
| 3,245,737 | 4/1966 | Kleinhans . |
| 3,356,552 | 12/1967 | Pearl . |
| 3,436,352 | 4/1969 | Revoir et al. . |
| 3,585,082 | 6/1971 | Siller . |
| 3,820,309 | 6/1974 | Cullen et al. . |
| 4,093,105 | 6/1978 | Russell et al. . |
| 4,772,300 | 9/1988 | Cullen et al. . |
| 4,783,206 | 11/1988 | Cullen et al. . |
| 4,863,051 | 9/1989 | Eibner et al. ............ 215/261 |
| 4,935,371 | 6/1990 | Rickloff ................. 435/296 |
| 5,005,763 | 4/1991 | Cullen et al. . |
| 5,092,914 | 3/1992 | Cullen et al. . |
| 5,186,775 | 2/1993 | Cullen et al. . |
| 5,439,124 | 8/1995 | Mock .................... 215/40 |

FOREIGN PATENT DOCUMENTS 1-139120  5/1989  Japan .

*Primary Examiner*—Stephen K. Cronin
*Attorney, Agent, or Firm*—Joseph P. Gastel

[57] ABSTRACT

A canister including an elongated hollow plastic body having a wall with inner and outer surfaces, an edge portion on the wall defining an open end, an end on the edge portion extending transversely to the inner and outer surfaces, a porous plastic member having an outer edge portion extending across the open end and fused to the end, an inner portion on the porous plastic member located radially inwardly of the outer edge portion and extending into the body and fused to the inner surface of the wall adjacent the end thereof, and a gas-treating material in the body. A method of fabricating the above canister including the steps of applying pressure and vibratory welding energy to the porous member to thereby cause the member which was originally planar in shape to have its outer edge compressed against the end of the body and fused thereto and the central portion inwardly of the outer edge forced into the body and its outer edge fused to the inner surface of the body adjacent the end.

17 Claims, 3 Drawing Sheets

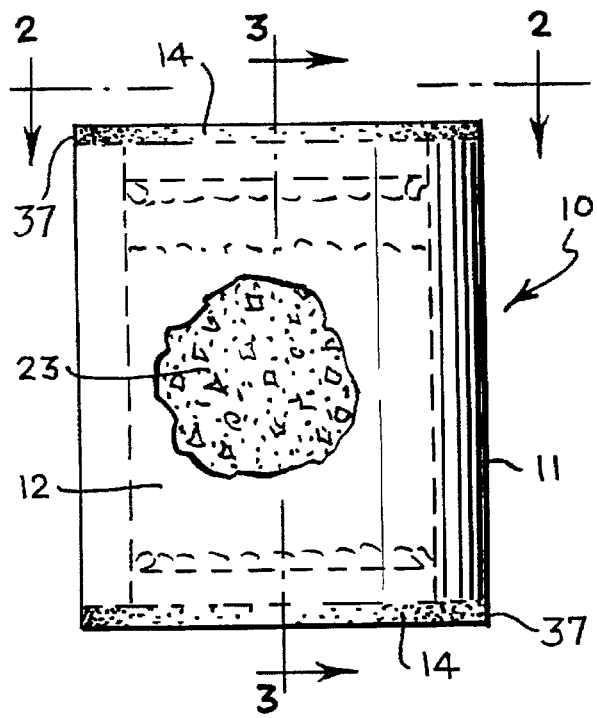
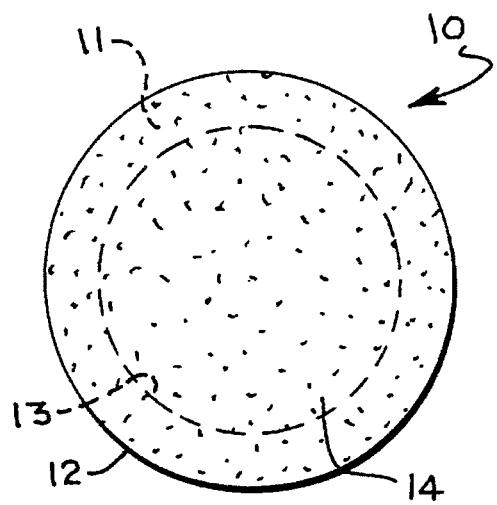
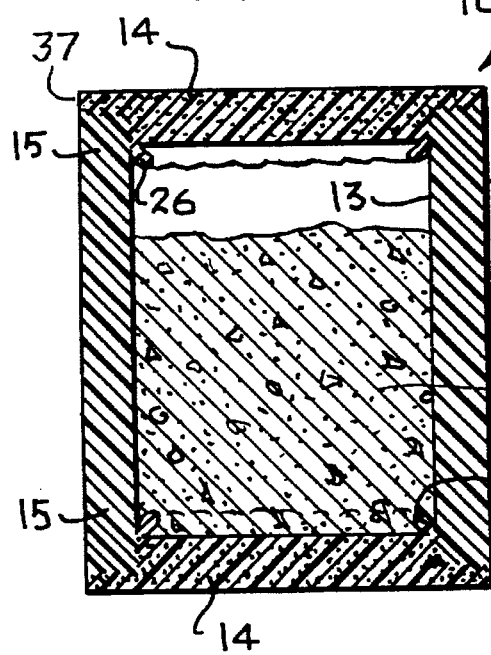
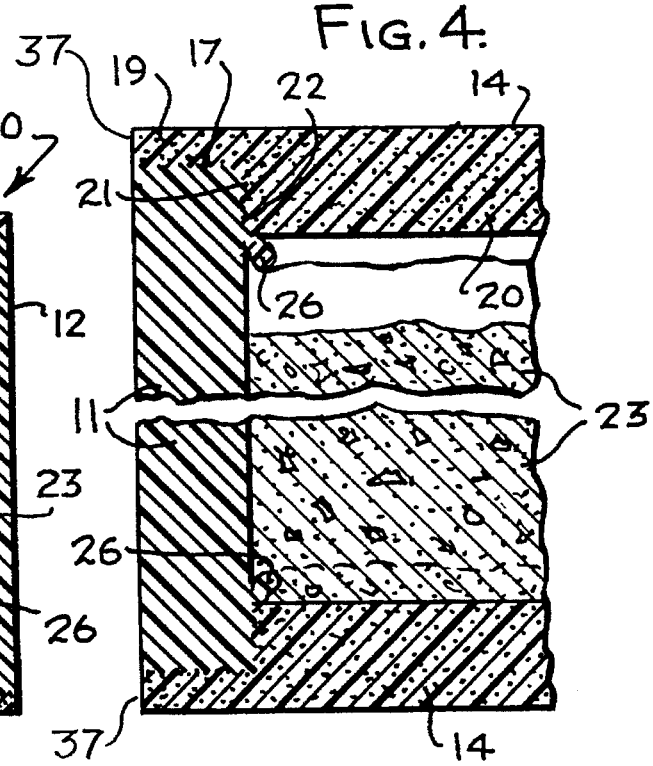

ns
5,641,088

CANISTER WITH POROUS PLASTIC ENDS

This is a division of application Ser. No. 08/219,400 filed Mar. 29, 1994 now U.S. Pat. No. 5,503,662.

BACKGROUND OF THE INVENTION

The present invention relates to an improved canister for containing gas-treating material such as a desiccant or oxygen absorber.

By way of background, there are in use canisters of various types for adsorbing moisture from pharmaceutical containers and for treating environments by absorbing gases therefrom. One type of prior canister is disclosed in U.S. Pat. No. 4,772,300 wherein a web-bonded polyethylene is secured to the ends of a polyethylene body by means of ultrasonic welding. However, there was no consistency in obtaining good uniform welds therebetween. It is believed that the deficiency was due to the fact that the interface of both parts did not melt at the same time to create a good fused bond.

SUMMARY OF THE INVENTION

It is the primary object of the present invention to provide a canister wherein at least one porous end thereof is firmly secured to the body by means of vibratory welding, thereby producing a secure bond therebetween.

Another object of the present invention is to provide an improved canister wherein a porous end is secured to the body at two annular joints thereby assuring bonding therebetween which virtually precludes separation which could lead to spilling of the contents of the canister.

A further object of the present invention is to provide an improved method for fabricating a canister having a porous end. Other objects and attendant advantages of the present invention will readily be perceived hereafter.

The present invention relates to a canister comprising an elongated hollow plastic body having a wall, inner and outer surfaces on said wall, an edge portion on said wall defining an open end, an end on said edge portion extending transversely to said inner and outer surfaces, and a porous plastic member having an outer edge portion extending across said open end and being sufficiently stiff so as to be fused to said end by vibratory welding.

The present invention also relates to a canister comprising an elongated hollow plastic body having a wall, inner and outer surfaces on said wall, an edge portion on said wall defining an open end, an end on said edge portion extending transversely to said inner and outer surfaces, and a porous plastic member having an outer edge portion extending across said open end and fused to said end and having an inner portion located radially inwardly of said outer edge and extending into said body and fused to said inner surface of said wall adjacent said end. The canister can contain a gas-treating material which adsorbs moisture or absorbs other gases such as oxygen.

The present invention also relates to a method of fabricating a canister comprising the steps of providing an elongated tubular plastic body having an inner surface and an outer surface and an edge portion on said body defining an opening and an end on said edge portion, providing a porous sheet-like plastic member which is sufficiently stiff so that it will not buckle when subjected to pressure in a direction transverse thereto and to vibratory welding energy substantially parallel thereto both of which are experienced when it is subjected to vibratory welding, positioning said porous sheet-like plastic member across said opening and in engagement with said end, and applying pressure in a direction transverse to said sheet-like member and vibratory welding energy in a direction substantially parallel to said sheet-like member to bond said sheet-like member to said end.

The present invention also relates to a method of fabricating a canister comprising the steps of providing an elongated tubular plastic body having an inner surface and an outer surface and an edge portion on said body defining an opening and an end on said edge portion, positioning a porous sheet-like plastic member across said opening in engagement with said end, applying pressure to said member to force an outer edge portion thereof against said end and to force an inner portion located inwardly of said outer edge portion into said opening, and applying vibratory welding energy to said member to effect fusion between said outer edge portion of said member and said end and to also effect fusion between said inner portion of said member and said inner surface of said edge portion adjacent said end.

The various aspects of the present invention will be more fully understood when the following portions of the specification are read in conjunction with the accompanying drawings wherein:

BRIEF DESCRIPTION OF THE DRAWINGS

FIG. 1 is side elevational view of the improved canister of the present invention;

FIG. 2 is a plan view taken substantially in the direction of arrows 2—2 of FIG. 1;

FIG. 3 is a cross sectional view taken substantially along line 3—3 of FIG. 1;

FIG. 4 is an enlarged fragmentary cross sectional view taken substantially along line 3—3 of FIG. 1 and showing the details at the locations between the body and the porous ends of the canister;

DESCRIPTION OF THE PREFERRED EMBODIMENTS

Figure 5:
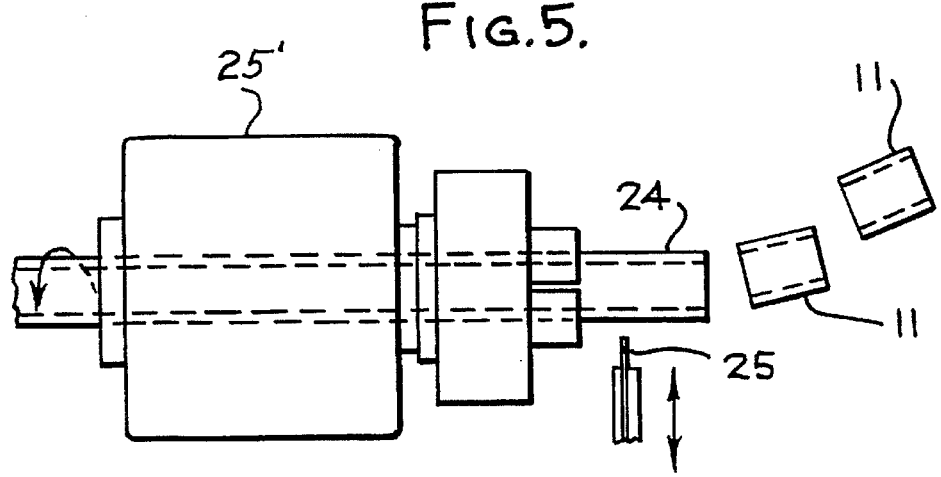
FIG. 5 is a schematic fragmentary plan view showing a tube being cut into lengths for providing the bodies of the canisters.
Figure 6:
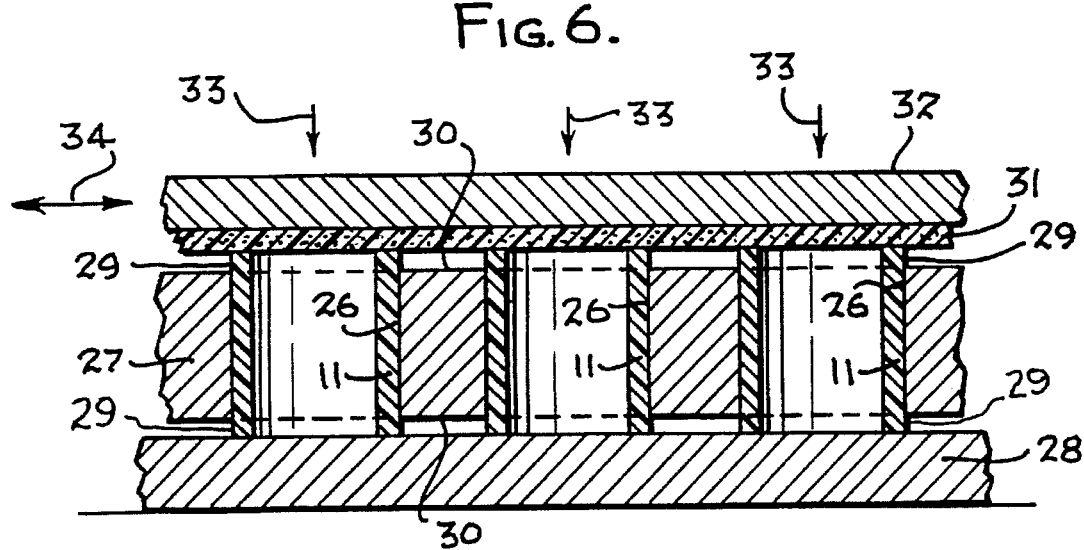
FIG. 6 is a schematic fragmentary side elevational view in cross section depicting the next step in fabricating the canisters by attaching porous ends to the first ends of the canisters by vibratory welding after they have been placed in a fixture.

The improved gas-treating canister 10 of the present invention includes a cylindrical canister body 11 fabricated of high density polyethylene and having an outer surface 12 and an inner surface 13. Porous closure members of high density polyethylene 14 are bonded to end portions 15 of canister body 11 by vibratory welding. More specifically, porous closure members 14 include outer edge portions 19 which are bonded to ends 17 at the junctions therebetween. In addition, porous members 14 include central inner portions 20 which are located within body 11 and have surface portions 21 located radially inwardly of outer edge portions 19. The outer edges 21 of portions 20 are bonded to the inner surface at 22 adjacent to ends 17. In addition, annular beads 26 are formed during the vibratory welding process and provide an additional bond between porous members 14 and body 11. Thus, each member 14 is bonded at three locations, namely, at annular end 17 and at annular surface 22 adjacent end 17 and at annular beads 26, to thereby securely contain the granular material 23 within the canister 10.

The canister 10 possessing the above-described multiple bond on members 14 is fabricated in the manner shown in FIGS. 5–10. The first step in the process is to provide bodies 11. These can be obtained by cutting an extruded high density polyethylene tube 24 into bodies 11 by means of a suitable cutting blade 25 associated with a tube rotating and advancing device 25', or the bodies 11 can be obtained in any other suitable manner. The next step is to press fit bodies 11 into a fixture 27 with only very small end portions 29 at both ends of bodies 11 protruding beyond the surfaces 30 of fixture 27. This causes them to be held securely during the subsequent vibratory welding operations. Thereafter, a sheet of porous high density polyethylene 31 is laid across the open ends of canister bodies 11. Sheet 31 has a matte surface and a shiny surface. Preferably the matte surface of sheet 31 is placed in contiguous relationship to the ends of bodies 11, but the shiny surface can be placed against the ends of the bodies 11. Thereafter, a vibratory welding die 32 is applied to sheet 31 with sufficient pressure to compress the portions 19 (FIG. 4) which are bonded to the ends 17 and to also force the uncompressed central portions 20 into the interior of the body 11. The protruding end portions 29, which are opposite to the ends to which the vibratory die 32 is applied, are supported by base portion 28 associated with fixture 27. The pressure which is applied is depicted by arrows 33 and the vibratory motion, which is horizontal, is depicted by arrows 34. Porous plastic sheet 31 is sufficiently stiff so that it will not buckle when subjected to the pressure and the vibratory motion. It is this combination of pressure and horizontal vibratory motion which effects the multiple bonds discussed above relative to FIGS. 3 and 4. It is believed that the bead 26 is formed as a result of flow of molten polyethylene which is produced during the vibratory welding process.

Figure 7:
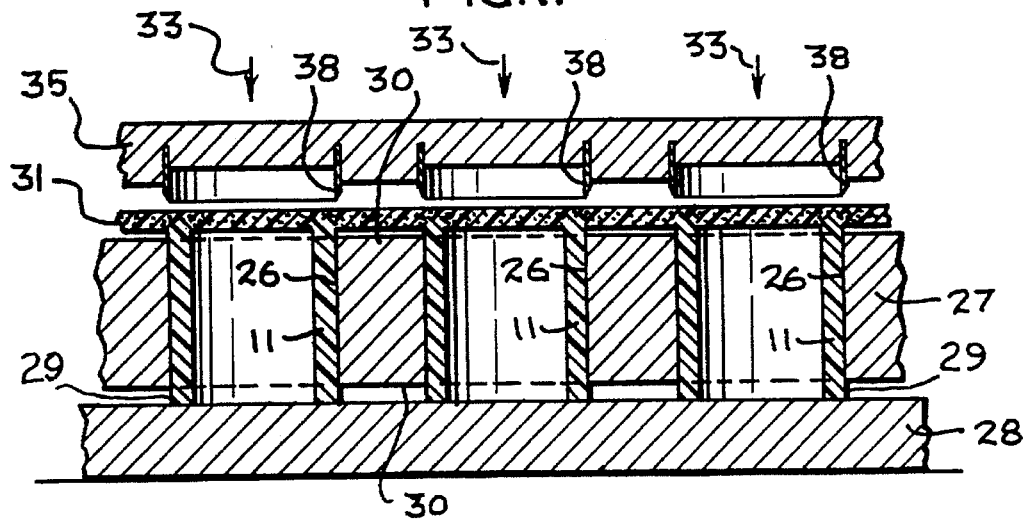
FIG. 7 is a view similar to FIG. 6 but showing the next step in the process, namely, trimming excess porous materials away from the ends of the canisters.
Figure 8:
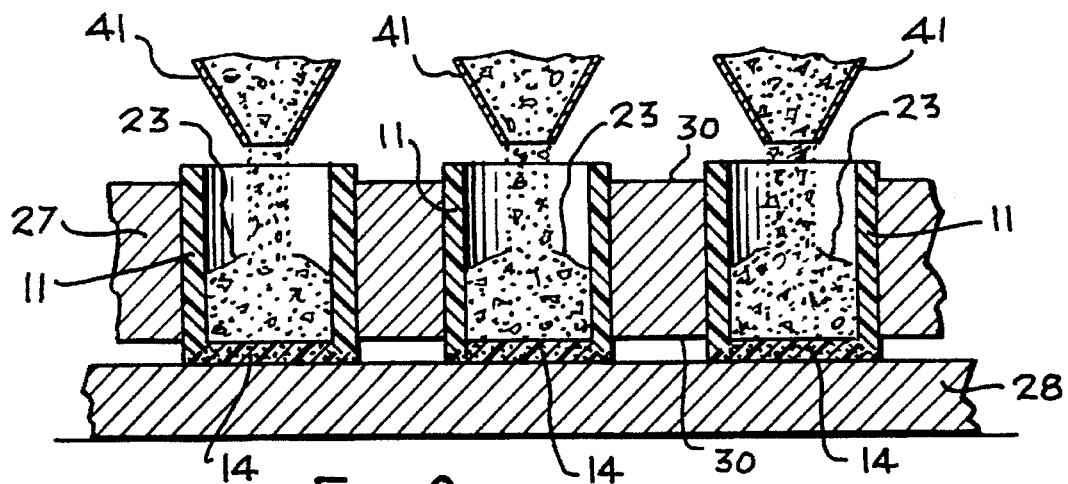
FIG. 8 is a schematic view in cross section showing the next step, namely, filling the open ends of the canisters with gas-treating material.
Figure 9:
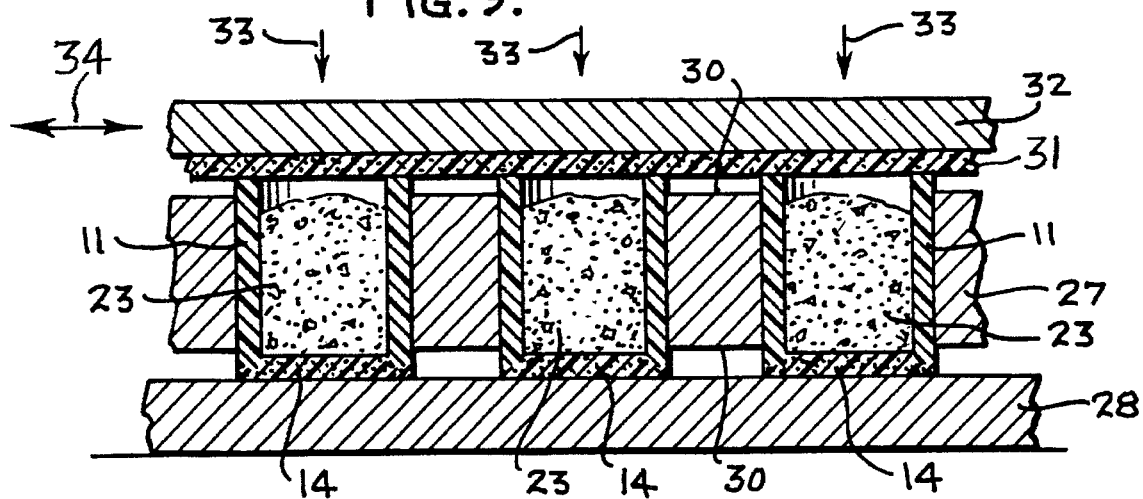
FIG. 9 is a view similar to FIG. 6 and showing the next step, namely, bonding porous members to the opposite ends of the canister bodies after they have been filled with gas-treating material.
Figure 10:
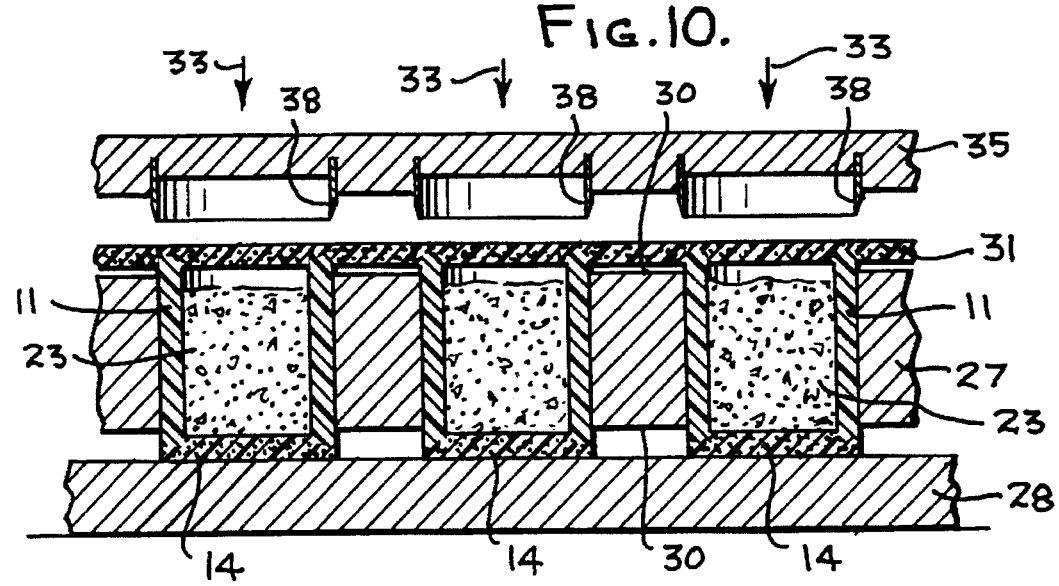
FIG. 10 is a view similar to FIG. 7 and showing the excess porous material being trimmed from the ends of the canisters.

After the porous plastic sheet 31 has been bonded to the plurality of bodies 11, a trimming die 35 is applied to the sheet 31, as depicted in FIG. 7, and the excess material of sheet 31 is trimmed away so that only the smooth outer edge of member 14 exists at 37 on each of the bodies 11. As shown in FIG. 7, trimming die 35 consists of a plurality of circular knives 38 which trim away the material of sheet 31 which lies outside of ends 14.

The next step of the process is to place the bodies which were formed in FIG. 7 into an inverted position by inverting fixture 27 and fill the bodies 11 with granular material 23 from a source such as hoppers 41. Thereafter, another sheet of porous high density plastic material 31 is placed across the open ends of bodies 11 which are held in fixture 27, and a vibratory welding die 32 applies pressure depicted by arrows 33 and horizontal vibration depicted by arrow 34 to the top of plastic sheet 31 to thereby form ends 14 as described above relative to FIGS. 4 and 7. During this procedure, the ends of bodies 11 which were previously closed with porous ends 14 are supported on base 28. Thereafter, a trimming die 35 is utilized to trim the excess porous material 31 away from the ends of bodies 11.

In specific canisters which have been fabricated, the bodies 11 are high density polyethylene. The bodies 11 have an outer diameter of approximately 0.55 inches, a length of approximately 0.630 inches and a wall thickness of approximately 0.035 inches and they have been fabricated from a product known as Phillips HM520BN FDA grade high density polyethylene. When the bodies 11 are properly positioned in bores 26 of fixture 27, they protrude about 0.030 inches at each end.

In the specific canisters which have been fabricated, the sheets 31 are porous high density polyethylene which is known under the trademark POREX which is a proprietary product of Porex Technologies of Fairburn, Ga. The sheet 31 of POREX is originally 0.035 inches plus or minus 0.005 inches thick. It has an air flow of 1900–3800 milliliters per minute through a one-inch diameter disc at a pressure of 1.2 inches of water. It will be appreciated that other porosities may be used, depending on the specific requirements of any particular application. The sheet 31 has a stiffness which is measured as the apparent bending modulus which is indicated on a straight line graph of Deflection versus Apparent Bending which is a plot of degrees deflection versus psi wherein the degrees are between 8 and 30 and the psi is between 327 and 1226 when tested on a one inch-pound Tinius Olsen Stiffness Testing Machine (Condensation of ASTM D 747) wherein the span length is 0.5 inches and the sheet width is 0.5 inches and the sheet thickness is 0.04 inches and the load is 0.15 pounds with a load scale reading of 50%. It will be appreciated that other stiffnesses are acceptable. The criterion is that the sheet 31 should be sufficiently stiff so that it will not buckle when subjected to the forces encountered during vibratory welding.

Each porous member 14 retains the 0.035 inch dimension in the central portion 20 which enters body 11. The outer edge portion 19, however, is compressed to about 0.010 inches as a result of the above-described vibration welding under pressure. It will be appreciated that other types of porous polyethylene which have other parameters can be used.

The vibration welding process described above utilizes a clamping force or pressure of between about 700–900 pounds per square inch, and it includes a cycle time of 2 seconds which includes a weld time of 1.5 seconds with a subsequent hold time of 0.5 seconds being held at the maximum clamping force which is applied. The vibratory welding produces a sinusoidal waveform having an amplitude of 0.070 inches and a nominal frequency of 240 Hz. The stiffness of the material 31 permits the use of vibratory welding. In this respect, the material would tend to oscillate if it were not sufficiently stiff, and therefore it would tend to buckle. However, because the material 31 is sufficiently stiff, it will not buckle. The vibratory welding die which was used in the specific instance is known under the name of BRANSON, and is manufactured by Branson Plastic Joining, Inc. of Henrietta, N.Y. The foregoing vibratory welding process causes fusion between members 14 and body 11 at ends 17 and at surfaces 22 and at beads 26. This fusion is obtained because both parts 11 and 14 in both interface areas 17 and 22 melt at substantially the same time under the foregoing circumstances notwithstanding their differences in porosity. The fact that they melt substantially simultaneously is unexpected because they are so different in porosity.

It will be appreciated that the bodies 11 may be made of other resins of polyethylene and in other sizes, which includes other diameters, other lengths, and other wall thicknesses. It will also be appreciated, as noted above, that the porous high density polyethylene which is used for end members 14 can be made in other stiffnesses, other thicknesses and other porosities also if desired. The changes in parameters of the bodies 11 and end members 14 may require changes in the vibratory welding parameters.

The granular material 23 which was actually used in the canisters 10 is known as Crosfield white silica gel having a particle size of about 0.5–1 millimeter, and the canisters 10 containing such silica gel are intended for use in adsorbing moisture in various environments such as pharmaceutical containers, food containers, and in any other environments where moisture adsorption is desired. It will be appreciated, however, that any other type of granular or nongranular gas-treating material can be used including by way of example and not of limitation such materials as activated charcoal, molecular sieve, activated bentonite, montmorillonite, calcium sulfate, Clintolite and crystalline metal aluminosilicates. The canisters can also contain any other suitable product including but not limited to conventional oxygen absorbing compositions and conventional carbon dioxide absorbing compositions. The foregoing products absorb or adsorb gases from the environments in which the canisters are placed. However, the canisters can also contain products which produce vapors which pass into the environment in which the canisters are located, and such vapors, by way of example and not of limitation, are fragrances and carbon dioxide. Therefore, the material within the canister body 11 will be characterized as "gas treating."

In addition to the foregoing, while the specific material of canister 10 has been described above as being high density polyethylene, it is to be understood that polypropylene can also be used for both the body 11 and the porous member 14, and the parameters for effecting the vibratory welding will have to be adjusted accordingly. It is also believed that other resins may also be used to provide canisters of the type depicted in FIGS. 1–4 wherein the porous ends are bonded at multiple annular locations as described above. These other resins, by way of example and not of limitation, may include nylon, polyvinylidene fluoride (PVDF), polytetrafluoroethylene (PTFE), styrene-acrylonitrile (SAN), polysulfone (PS), ethylene-vinyl acetate (EVA), polycarbonate (PC), polyphthalate carbonate (PPC) and polyether sulfone (PES).

While the canister 10 has been described above as having two porous end members 14, it will be appreciated that it can be fabricated with only one porous end, such as 14, and with another end which is not porous, and the other end may be formed integrally with the body or attached thereto. Also, while the canister has been described as containing a gas-treating composition, it is believed that it has general applicability irrespective of its contents. In this respect, for example, it may contain a product which must be allowed to breathe but which does not otherwise absorb, adsorb, or in any other way interact with gases outside of the canister.

While preferred embodiments of the present invention have been disclosed, it will be appreciated that it is not limited thereto but may be otherwise embodied within the scope of the following claims.

What is claimed is:

1. A canister comprising an elongated hollow canister body having a wall, an edge portion on said wall defining an open end, an outer end on said edge portion, an inner surface on said wall, and porous plastic closure means secured to said outer end and to said inner surface of said wall at said edge portion for permitting communication between the inside of said canister and gases outside of said canister.

2. A canister as set forth in claim 1 including a fused bead of plastic between said porous plastic closure means and said wall.

3. A canister as set forth in claim 1 wherein said canister includes a second edge portion on said wall defining a second open end, a second outer end on said second edge portion, a second inner surface on said wall at said second edge portion, and second porous plastic closure means secured to said second outer end and to said second inner surface of said wall at said second edge portion of said second open end for permitting communication between the inside of said canister and gases outside of said canister.

4. A canister as set forth in claim 3 including a first bead of fused plastic between said porous plastic closure means and said wall, and a second fused bead of plastic between said second porous plastic closure means and said wall.

5. A canister comprising a plastic canister body having a wall, inner and outer surfaces on said wall, an edge portion on said wall defining an open end, an extreme outer end on said edge portion, and a plastic closure having an edge portion fused to said extreme outer end and having a central portion extending into said canister body and fused to said inner surface of said edge portion of said wall, said plastic closure being sufficiently stiff to withstand vibratory welding forces having a pressure component transverse to said extreme outer end and a vibration component transverse to said pressure component which are utilized to fuse said plastic closure to said extreme end and said edge portion of said canister body.

6. A canister as set forth in claim 5 including a bead of fused plastic between said plastic closure and said wall.

7. A canister comprising a plastic canister body having a wall, inner and outer surfaces on said wall, an edge portion on said wall defining an open end, an extreme outer end on said edge portion, and a porous plastic closure having an edge portion fused to said extreme outer end and having a central porous portion extending into said canister body and fused to said inner surface of said edge portion of said wall, said porous plastic closure being sufficiently stiff to withstand vibratory welding forces having a pressure component transverse to said extreme outer end and a vibration component transverse to said pressure component which are utilized to fuse said porous plastic closure means to said canister body.

8. A canister as set forth in claim 7 including a second edge portion on said wall defining a second open end, a second extreme outer end on said second edge portion, and a second porous plastic closure having a second outer edge portion fused to said second extreme outer end and having a second central porous portion extending into said canister body and fused to said inner surface of said second edge portion of said wall, said second porous plastic closure being sufficiently stiff to withstand vibratory welding forces having a pressure component transverse to said second extreme outer end and a vibration component transverse to said pressure component which are utilized to secure said second porous plastic closure means to said canister body.

9. A canister as set forth in claim 8 including a first bead of fused plastic between said porous plastic closure means and said wall, and a second bead of fused plastic between said second porous plastic closure means and said wall.

10. A canister comprising an elongated hollow plastic canister body having a wall, inner and outer surfaces on said wall, an edge portion on said wall defining an open end, an extreme outer end on said edge portion extending transversely to said inner and outer surfaces, and a plastic closure extending across said open end, said plastic closure having an outer edge portion fused to said extreme outer end of said edge portion of said wall for securing said plastic closure to said wall, said plastic closure also having an inner central porous portion located radially inwardly of said outer edge portion of said plastic closure, said central porous portion extending into said canister body and having an outer surface fused to said inner surface of said wall adjacent said extreme outer end for additionally securing said plastic closure to said wall.

11. A canister as set forth in claim 10 including a bead of fused plastic between said inner surface of said wall and said inner central porous portion at the end of said outer surface of said inner central porous portion.

12. A canister as set forth in claim 10 wherein said plastic closure is fused to said canister body by vibratory welding which forces said inner central porous portion of said plastic closure into said canister body and causes said outer surface of said inner central porous portion to be fused to said wall adjacent said extreme outer end in addition to causing said outer edge portion of said plastic closure to be fused to said extreme outer end of said wall.

13. A canister as set forth in claim 12 including a bead of fused plastic formed as a result of said vibratory welding and located between said inner surface of said wall and said inner central porous portion at the end of said outer surface of said inner central porous portion.

14. A canister as set forth in claim 10 including a second edge portion on said wall at the opposite end of said canister body from said edge portion, said second edge portion defining a second open end, a second extreme outer end on said second edge portion extending transversely to said inner and outer surfaces, and a second plastic closure extending across said second open end, said second plastic closure having a second outer edge portion fused to said second extreme outer end of said second edge portion of said wall for securing said second plastic closure to said wall, said second plastic closure also having a second inner central porous portion located radially inwardly of said second outer edge portion of said second plastic closure, said second central porous portion extending into said canister body and having a second outer surface fused to said inner surface of said wall adjacent said second extreme outer end for additionally securing said second plastic closure to said wall.

15. A canister as set forth in claim 14 including a bead of fused plastic between said inner surface of said wall and said inner central porous portion at the end of said outer surface of said inner central porous portion, and a second bead of fused plastic between said inner surface of said wall and said second inner central porous portion at the end of said second outer surface of said second inner central porous portion.

16. A canister as set forth in claim 14 wherein said plastic closure and said second plastic closure are fused to said canister body by vibratory welding which forces said inner central porous portions of said first and second plastic closures into said canister body and causes said outer surface of said inner central porous portion and said outer surface of said second inner central porous portion to be fused to said wall adjacent said extreme outer end and said second extreme outer end, respectively, in addition to causing said outer edge portion of said plastic closure and said second outer edge portion of said second plastic closure to be fused to said extreme outer end of said wall and said second extreme outer end of said wall, respectively.

17. A canister as set forth in claim 16 including a first bead of fused plastic formed as a result of said vibratory welding and located between said inner surface of said wall and said inner central porous portion at the end of said outer surface of said inner central porous portion, and a second bead of fused plastic formed as a result of said vibratory welding and located between said inner surface of said wall and said second inner central porous portion at the end of said second outer surface of said second inner central porous portion.

* * * * *